Patented July 7, 1931

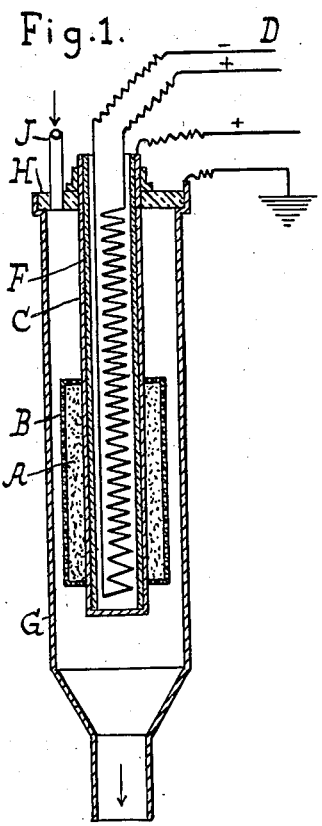
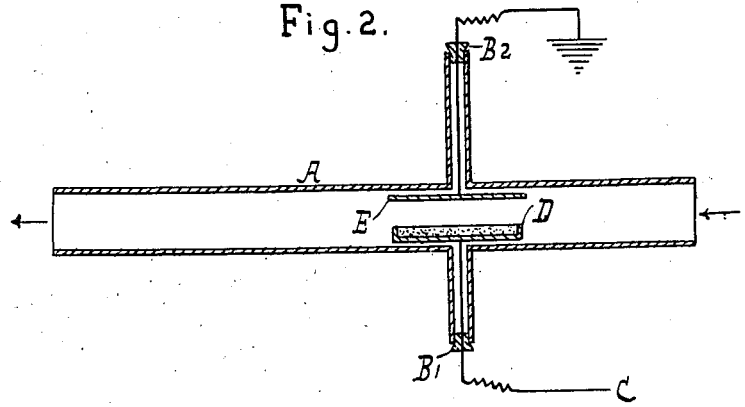

1,813,514

UNITED STATES PATENT OFFICE

OTTO SCHMIDT AND OTTO GROSSKINSKY, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF CARBON BLACK AND APPARATUS THEREFOR

Application filed September 4, 1929, Serial No. 390,367, and in Germany October 10, 1928.

This invention relates to improvements in and apparatus for the manufacture and production of carbon black.

We have found that a particularly finely divided carbon black is obtained by decomposing compounds of carbon in the gaseous or vaporous state, in particular hydrocarbons, for example, unsaturated hydrocarbons, such as acetylene, or allylene, or olefines or diolefines, such as ethylene, propylene, butylene, butadiene and the homologues of the said unsaturated hydrocarbons and also saturated hydrocarbons, such as methane or ethane or even high hydrocarbons of the paraffin, aromatic or hydroaromatic series or mixtures of these substances, or carbon monoxide, or carbon dioxide, or mixtures thereof with hydrocarbons with catalysts and with the employment of an electric field in the presence or absence of other gases or vapours, and at any suitable pressure. Thus, the pressure may be atmospheric or reduced or elevated. If elevated pressures be employed, usually those of about 10, 20, 50, 100, 200 or even more atmospheres are suitable.

Temperatures ranging between about 25° and 800° centigrade may be employed for the process, and generally temperatures ranging between about 300° and 500° centigrade furnish very good results, but temperatures considerably above the said ranges may also be employed. If a relatively low temperature is employed, a carbon black is obtained having an excellent covering power and blackness. Even higher temperatures for example temperatures between 600° and 1000° centigrade may be employed particularly when aromatic hydrocarbons serve as the initial materials. Generally speaking, higher temperatures are usually required for the production of carbon black from saturated hydrocarbons than from unsaturated hydrocarbons.

As examples of other gases or vapours may be mentioned water vapour, nitrogen peroxide, carbon dioxide, nitrogen, hydrogen, which under the conditions of working employed does not have a hydrogenating action, methane, ethane and other lower hydrocarbons, which may, however, themselves be decomposed to carbon black. The said other gases may be employed in molecular or any other proportions with reference to the compounds of carbon to be decomposed.

Catalysts having a dehydrogenating action are particularly advantageous for the process according to the present invention, and in particular those comprising metals of the iron group as such or in the form of their compounds, for example in the form of shavings, cuttings, balls and the like, namely iron, nickel or cobalt, or compounds thereof, oxides in particular being very suitable. The metals of the iron group obtained by the reduction of the corresponding oxides, nitrates, carbonates, hydroxides and the like, are particularly advantageous. The said catalytic materials may be employed alone or as mixtures and their activity may be increased by the addition of activating substances, in particular oxides, hydroxides, or carbonates of sodium, potassium, boron, magnesium, barium, strontium, calcium, cadmium, zinc, aluminium, manganese, vanadium, chromium, titanium or thorium or also the said metals themselves may be added, or phosphorus pentoxide, if they are stable under the conditions of working. The said additions may be employed in small amounts, for example, up to about 10 per cent, but often it will prove advantageous to employ larger amounts thereof, for example, a greater amount of the said additions than of the aforesaid metals from the iron group or the compounds thereof.

The aforesaid substances may also be employed on carriers, for example, pumice, fire clay, silica gel, charcoal, magnesia, fuller's earth and the like.

In accordance with the present invention the materials of which the electrically charged electrodes are constructed, or which they comprise, which may consist, for example, of the metals of the iron group, as such or in the form of their compounds, for example, cobalt, nickel or iron, may themselves serve as catalysts. Thus, for example, the carbon black obtained from ethylene in the presence of electrically charged nickel or cobalt is considerably deeper in colour than the carbon lack obtained without charging the metal. This action may possibly be explained by assuming that during the reaction the carbon produced in the form of ions and the comination of several particles of carbon to form larger complexes is rendered difficult by the charging of the catalyst, though this is only suggested by way of theory, and makes no difference in the actual practice of the invention.

Both continuous currents and alternating currents may be employed in the process according to this invention, and the currents are usually of very small magnitude, for example, of the order of 1 milliampere or below, although, if desired, currents of higher or lower magnitude may be employed. Thus, for example, with a voltage of 100, the electrodes being 5 centimetres apart, a current of about $10^{-9}$ to $10^{-5}$ amperes is employed. The voltage may be very low, for example, only a few volts, but voltages considerably higher may also prove advantageous, for example, of 200 volts or even more.

The apparatus and electrodes employed according to this invention may be constructed of any suitable refractory material, for example, quartz, porcelain or metals, such as aluminium, copper or chromium, or alloys thereof, such as brass, or of alloy steels, or of zinc-plated, aluminium-plated, copper-plated, or tin-plated iron.

The following examples will further illustrate the nature of the invention, but the invention is not restricted thereto, Examples 1 and 3 being explained with reference to Figures 1 and 2, respectively, of the accompanying drawings, which show arrangements of apparatus in vertical section for carrying out the process of the invention.

Example 1

In Figure 1 a nickel catalyst A, which is obtained by the reduction of compressed nickel oxide at a temperature of 320° centigrade, is placed in a vertically suspended wire cage B arranged round and electrically connected with a tube C which is heated from the interior, by means of an electric resistance heating device D through which a current flows with a tension of 200 volts, which tube serves as the positive electrode. The said tube is insulated by means of a mass F from the carbon heating device which it contains. The said positive electrode B is arranged within a reaction vessel of aluminium G and insulated therefrom by means of a stopper H, the said vessel serving as the counter-electrode. The electrode is charged with a tension of 80 volts, whereas the counter-electrode is earthed. Ethylene introduced at J is passed over the catalyst at ordinary pressure and at a temperature of about 400° centigrade, and at the same time the catalyst is charged positively to a tension of about 80 volts. In a short period of time a very finely divided carbon black collects on the positive electrode, and this may be caused to fall off by tapping or by interrupting or reversing the current. The decomposition of the ethylene is practically quantitative. The carbon black thus obtained possesses an extraordinary fineness and blackness.

The ethylene may be replaced by other olefines or carbon compounds. Instead of the pure gases, mixtures may also be employed, in particular mixtures with nitrogen, carbon dioxide, water vapour, methane, ethane, and the like. The tension may be varied within wide limits. The process may also be carried out under diminished or increased pressure.

Example 2

A mixture is prepared from 96 per cent of cobalt oxide, and a small addition say, 3 per cent of zinc oxide and 1 per cent of molybdic acid, and this is pressed and arranged to serve as a catalyst in a horizontal tube of brass, where the said mixture is reduced in a current of hydrogen at a temperature of 320° centigrade. An electrode consisting of sheet aluminium insulated from the tube is arranged horizontally above the said catalyst. The said electrode is charged with a tension of about 80 volts, the metal tube and at the same time the catalyst which is in electrically conductive connection therewith is connected with the negative pole of a battery and is at the same time earthed. If a mixture of 1 part by volume of allylene having a boiling point of 23° centigrade below zero and of about 2 parts by volume of water vapour be passed through the tube at a temperature of between about 350° and 400° centigrade, a very good yield of a carbon black of very high dispersity and having a deep black colour is obtained.

In place of water vapour gaseous hydrocarbons, such as methane, ethane or ethylene may be employed as the extraneous gases or mixtures thereof.

Example 3

Referring to Figure 2 an aluminium boat D which serves as an electrode is filled with a catalyst prepared from a mixture of 96 parts of cobalt oxide, 3 parts of zinc oxide and 1 part of thorium dioxide which has been reduced with hydrogen at a temperature of about 330° centigrade and is arranged in a horizontal quartz tube A. A counter electrode E of aluminium sheeting is arranged horizontally above the said boat D and insulated therefrom, the said counter electrode being connected with the negative pole of a battery and with earth. The aluminium boat is charged to a tension of 80 volts and is connected with the positive pole of a battery by means of the wire C. Electrode and counter electrode are insulated by means of the stoppers $B_1$ and $B_2$. A mixture of 50 parts by volume of carbon monoxide, 10 parts by volume of water vapour and 40 parts by volume of nitrogen is passed through the tube at a temperature of about 400° centigrade, a carbon black very deep in colour being thus obtained.

*Example 4*

Propylene is passed under a pressure of 100 mm., a tension of 50 volts being employed, at a temperature of about 400° centigrade over a catalyst prepared by reduction of a mixture of 97 parts of cobalt oxide, 1 part of iron oxide and 2 parts of zinc oxide arranged in a tube similar to that described in Example 3. In this manner a carbon black is obtained having a deep brownish-black colour.

Instead of working under reduced pressure atmospheric pressure or elevated pressure may be employed. If the pressure be increased, it may be especially advisable to employ the propylene in admixture with extraneous gases, this step being advantageous, since injurious superheating of the carbon black is thereby avoided.

What we claim is:—

1. In the production of carbon black by decomposition, by heat treatment in the presence of catalysts, of carbon compounds in the gaseous phase, the step of carrying out the said decomposition while maintaining the reaction zone under the action of an electric field in the presence of water vapour.

2. A process for the production of carbon black, which comprises passing ethylene through a zone heated to a temperature of between about 350° and 400° C. and containing a catalyst prepared from cobalt oxide with a small addition of zinc oxide and molybdic acid, in which said zone an electric field is set up by means of a current having a tension of about 200 volts.

3. Apparatus for the production of carbon black by decomposition, by heat treatment in the presence of catalysts, of carbon compounds in the gaseous phase, comprising an earthed tube of refractory, electrically conductive material, a further tube of refractory, electrically conductive material arranged concentrically in the said first tube, so as to leave a considerable space between the two tubes, means for insulating the two tubes from one another, a heating device within said second tube, a catalyst arranged within the space between the two tubes, means for connecting the said second tube with a source of electricity and means for passing the said compound of carbon in the gaseous phase through the said space between the two tubes.

In testimony whereof we have hereunto set our hands.

OTTO SCHMIDT.
OTTO GROSSKINSKY.